United States Patent
Culler (10) Patent No.: US 6,795,055 B1
(45) Date of Patent: Sep. 21, 2004

(54) DEVICES, SYSTEMS AND METHODS FOR FACILITATING POSITIONING OF CURSOR ON DISPLAY DEVICE

(75) Inventor: Jason Harold Culler, Livermore, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 391 days.

(21) Appl. No.: 09/583,182

(22) Filed: May 30, 2000

(51) Int. Cl.[7] ................................................ G09G 5/08
(52) U.S. Cl. ..................... 345/157; 345/159; 345/856
(58) Field of Search ................................ 345/156–161, 345/163–179, 856–866, 965, 964, 966–968; 341/20; 395/500; 361/680, 681, 683, 686; 200/5 R

(56) References Cited

U.S. PATENT DOCUMENTS

| | | | | |
|---|---|---|---|---|
| 5,189,403 A | * | 2/1993 | Franz et al. | 345/168 |
| 5,195,179 A | * | 3/1993 | Tokunaga | 345/159 |
| 5,508,717 A | * | 4/1996 | Miller | 345/858 |
| 5,565,887 A | * | 10/1996 | McCambridge et al. | 345/157 |
| 5,771,038 A | * | 6/1998 | Wang | 345/161 |
| 5,874,943 A | * | 2/1999 | Fitzpatrick et al. | 345/159 |
| 6,052,115 A | * | 4/2000 | Gregg et al. | 345/159 |
| 6,100,875 A | * | 8/2000 | Goodman et al. | 345/159 |
| 6,115,029 A | * | 9/2000 | Jaaskelainen et al. | 345/159 |
| 6,181,325 B1 | * | 1/2001 | Lee | 345/156 |
| 6,188,390 B1 | * | 2/2001 | Selker et al. | 341/20 |
| 6,323,842 B1 | * | 11/2001 | Krukovsky | 345/156 |
| 6,342,877 B1 | * | 1/2002 | Nikom | 345/157 |
| 6,392,675 B1 | * | 5/2002 | Becker et al. | 345/858 |
| 6,466,199 B2 | * | 10/2002 | Takase et al. | 345/159 |

* cited by examiner

*Primary Examiner*—Henry N. Tran

(57) ABSTRACT

Devices, systems and methods for facilitating positioning of a cursor on a display device are provided. For example, an input device is provided which includes a shifter configured to electrically communicate with a computer. The shifter is configured to enable functional information, provided by a mouse-type input device, to provide selected functionality of the cursor. The shifter provides a shift-disable mode and a shift-enable mode so that, while in the shift-disable mode, the shifter enables the mouse-type input device to influence movement of the cursor on the display device. For instance, a movement of the mouse-type input device in a first direction and a first distance results in the cursor moving the first direction and a corresponding second distance. In the shift-enable mode, the shifter enables an altering of movement of the cursor so that movement of the mouse-type input device in the first direction and the first distance results in the cursor moving the first direction and a corresponding third distance, with the third distance being unequal to the second distance.

16 Claims, 5 Drawing Sheets

DEVICES, SYSTEMS AND METHODS FOR FACILITATING POSITIONING OF CURSOR ON DISPLAY DEVICE

BACKGROUND OF THE INVENTION

1. Field of the Invention

The present invention generally relates to input devices for computers and, in particular, to devices, systems and methods for facilitating positioning of a cursor on a display device of a computer-based system.

2. Description of the Related Art

With the use of large and multi-head display devices becoming ever more prevalent, computer operators, such as graphic and CAD designers, for example, are experiencing difficulties interfacing with computer applications displayed on the display devices when utilizing conventional mouse-type input devices. More specifically, computer operators are finding it difficult to utilize the increased display area provided by the larger and multi-head displays without experiencing a characteristic of cursor movement about the display known as "mouse twitch" or "jump."

As utilized herein, "twitch" or "jump" is defined as the tendency of a mouse-driven cursor to move in a manner not desired by the operator. For instance, twitch may occur when the operator attempts to actuate a function of a mouse-type input device, such as by depressing an actuator or button of the mouse. Movement of the cursor during an actuation of a mouse function may occur when the cursor is in a location on the display device that is not designated by one of a predetermined number of grid points. For instance, when the cursor is located at a non-grid point and a mouse function is actuated, typically, the cursor will tend to move, i.e., twitch or jump, to the grid point closest to the cursor's current location. Movement of the cursor during an actuation of a mouse function also may occur due to inadvertent movement of the mouse during such actuation. Additionally, when an operator utilizes large or multi-head display devices, typically, the operator selects speed/sensitivity settings for the mouse that allow a small movement of the mouse to correspond to a relatively large movement of the associated cursor across the display area(s). However, many operations, such as CAD operations, oftentimes require the use of precise (small) cursor movements which are not easily accommodated by the aforementioned operator-selected speed/sensitivity settings of the mouse.

Heretofore, in an effort to avoid mouse twitch or jump, computer operators typically change mouse speed and/or sensitivity settings for a mouse-type input device when switching between various computer applications and/or displays. Thus, it is not uncommon for a computer operator to switch mouse speed and/or sensitivity settings when switching from applications such as word processing, or other text-based applications, for example, to a graphic-based application, such as CAD, for instance, or even from one CAD function to another. However, since each change of mouse speed and/or sensitivity settings takes time, the efficiency of the computer operator may be reduced in proportion to the number of changes made.

Therefore, there is a need for improved devices, systems and methods which address these and other shortcomings of the prior art.

SUMMARY OF THE INVENTION

Briefly described, the present invention relates to input devices for computers and, in particular, to devices, systems and methods for facilitating positioning of a cursor on a display device of a computer-based system. Such a computer-based system is adapted to facilitate operation of a computer application which is adapted to display a cursor within a display area of a display device of a computer. Typically, the computer includes a mouse-type input device for providing movement information and functional information corresponding to the cursor so that the cursor is movable about the display area in response to the movement information and is adapted to provide selected functionality in response to the functional information.

In a preferred embodiment of the present invention, an input device is provided which includes a shifter configured to electrically communicate with the computer. The shifter is configured to enable functional information, provided by the mouse-type input device, to provide selected functionality of the cursor. The shifter also provides a shift-disable mode and a shift-enable mode so that, while in the shift-disable mode, the shifter enables the mouse-type input device to influence movement of the cursor on the display device. For instance, a movement of the mouse-type input device in a first direction and a first distance results in the cursor moving the first direction and a corresponding second distance. In the shift-enable mode, the shifter enables an altering of movement of the cursor so that movement of the mouse-type input device in the first direction and the first distance results in the cursor moving the first direction and a corresponding third distance, with the third distance being unequal to the second distance.

In another embodiment, an input device is provided for interfacing with a computer application. Preferably, the input device includes: means for enabling functional information, provided by the mouse-type input device, to provide selected functionality of the cursor; means for enabling the mouse-type input device to influence movement of the cursor on the display device so that a movement of the mouse-type input device in a first direction and a first distance results in the cursor moving a corresponding second direction and second distance; and means for enabling an altering of movement of the cursor so that movement of the mouse-type input device in the first direction and the first distance results in the cursor moving the second direction and a corresponding third distance, with the third distance being unequal to the second distance.

In another embodiment, a computer system for operating a computer application is provided. Preferably, the computer system includes a display device, a mouse-type input device and a shifter.

In still another embodiment, a computer readable medium incorporating a computer program for interfacing with a computer application is provided. Preferably, the computer readable medium includes: logic configured to enable movement information, provided by the mouse-type input device, to influence movement of the cursor on the display device so that a movement of the mouse-type input device in a first direction and a first distance results in the cursor moving a corresponding second direction and second distance; logic configured to enable functional information, provided by the mouse-type input device, to provide selected functionality of the cursor; and logic configured to enable an altering of movement of the cursor so that movement of the mouse-type input device in the first direction and the first distance results in the cursor moving the second direction and a corresponding third distance, with the third distance being unequal to the second distance.

Embodiments of the present invention also may be construed as providing methods for interfacing with a computer application. In a preferred embodiment, a method for interfacing with a computer application includes the steps of: enabling movement information provided by the mouse-type input device to influence movement of the cursor on the display device so that a movement of the mouse-type input device in a first direction and a first distance results in the cursor moving a corresponding second direction and second distance; enabling functional information, provided by the mouse-type input device, to provide selected functionality of the cursor; and enabling an altering of movement of the cursor so that movement of the mouse-type input device in the first direction and the first distance results in the cursor moving the second direction and a corresponding third distance, with the third distance being unequal to the second distance.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

Figure 1:
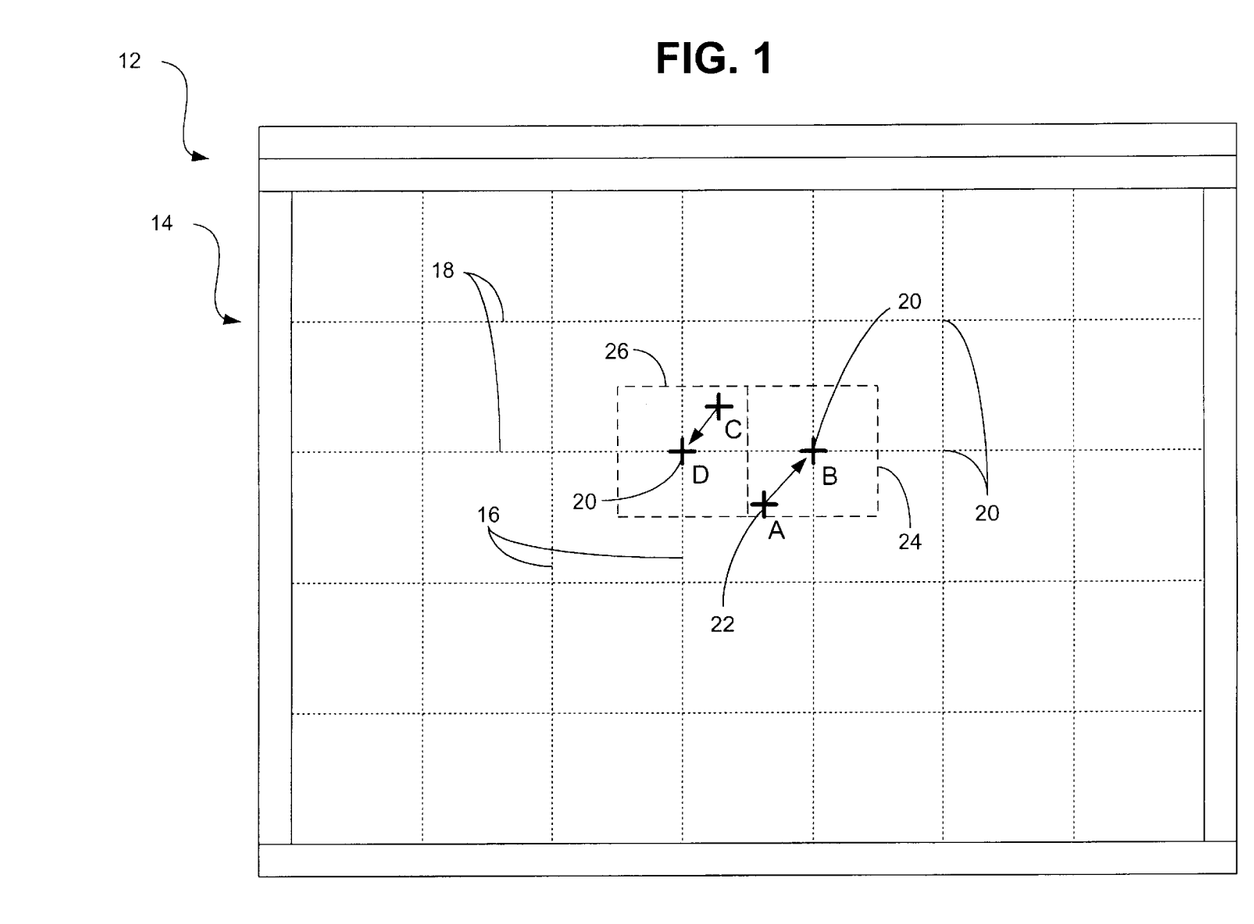
FIG. 1 is a diagram depicting mouse twitch or jump.

Reference will now be made in detail to the description of the invention as illustrated in the drawings with like numerals indicating like parts throughout the several views. As is known, a display device, e.g., a computer monitor, is configured for displaying graphical information provided by a processor-based system. For instance, a display device may be configured for presenting a computer application, such as a CAD application, to an operator. A representative depiction of a CAD application, as typically displayed on a display device, is shown in FIG. 1. It should be noted that the preferred embodiments of the present invention described herein will be discussed, primarily, in relation to a CAD application, such as the application depicted in FIG. 1, for ease of description and not for purposes of limitation. Thus, the present invention may be utilized with numerous other applications incorporating the use of a mouse-driven cursor, as described in detail hereinafter, with such other applications being considered well within the scope of the present invention.

As depicted in FIG. 1, CAD application 12 provides a computer operator with a grid network 14 formed of a series of horizontal rows 16 and a series of vertical columns 18, with the grid network, oftentimes, being displayed to the operator. A plurality of predetermined points 20 are established at the intersections of the rows and columns, thereby providing the operator with grid-established points at which a cursor, such as cursor 22, may be located when performing various functions provided by the application.

The computer operator typically interfaces with the application by manipulating a mouse-type input device (not shown) that provides x and y coordinate data, corresponding to the movements of the mouse-type input device, as well as function-actuation data, corresponding to actuation of a "left-click" or "right-click" button, for example, to the processor-based system. The processor-based system then evaluates the various data and displays an appropriately positioned cursor 22 on the display. Thus, by moving the mouse-type input device and/or by actuating various actuators of the device, the computer operator may enable various application functionality at various locations about the display.

As mentioned briefly hereinbefore, a cursor may present the operator with mouse twitch or jump. For instance, when the cursor 22 is displayed in position A (FIG. 1), which is defined by a point 20 of the grid network, and an actuator of the mouse-type input device is depressed or the mouse-type input device is inadvertently moved, the cursor may move without additional operator input to position B, which also is defined by a point 20 of the grid network. Thus, a zone 24 surrounds position B, whereby actuation of a mouse function while the cursor is displayed within the zone 24 results in the cursor moving to the center of that zone, e.g., the point 20 of the grid network. Likewise, a zone 26 surrounds position D, whereby actuation of a mouse function while the cursor is displayed within the zone 26, such as when the cursor is being displayed at position C, results in the cursor moving to the center of zone 26.

If the computer operator desires to have the particular mouse functionality enabled at the location A, and not at position B which occupies the center of zone 24, the operator typically must reset the mouse speed and/or sensitivity settings to an appropriate setting so that the position A may be appropriately and/or more conveniently recognized. As described in detail hereinafter, the present invention provides devices, systems and methods for repositioning the cursor (such as to position A) which, otherwise, typically is positioned by utilizing a mouse-type input device.

As mentioned briefly hereinbefore, cursor movement may be facilitated by the present invention which, hereinafter, may be referred to as "the shifter," "shifter system" and/or "method." The shifter system of the present invention can be implemented in hardware, software, firmware, or a combination thereof. In a preferred embodiment, however, the shifter system is implemented as a software package, which can be adaptable to run on different platforms and operating systems as shall be described further herein. In particular, a preferred embodiment of the shifter system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this document, a "computer-readable medium" can be any means that can contain, store, communicate, propagate or transport the program for use by or in connection with the instruction execution system, apparatus, or device. The computer readable medium can be, for example, but not limited to, an electronic, magnetic, optical, electro-magnetic, infrared, or semi-conductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 2:
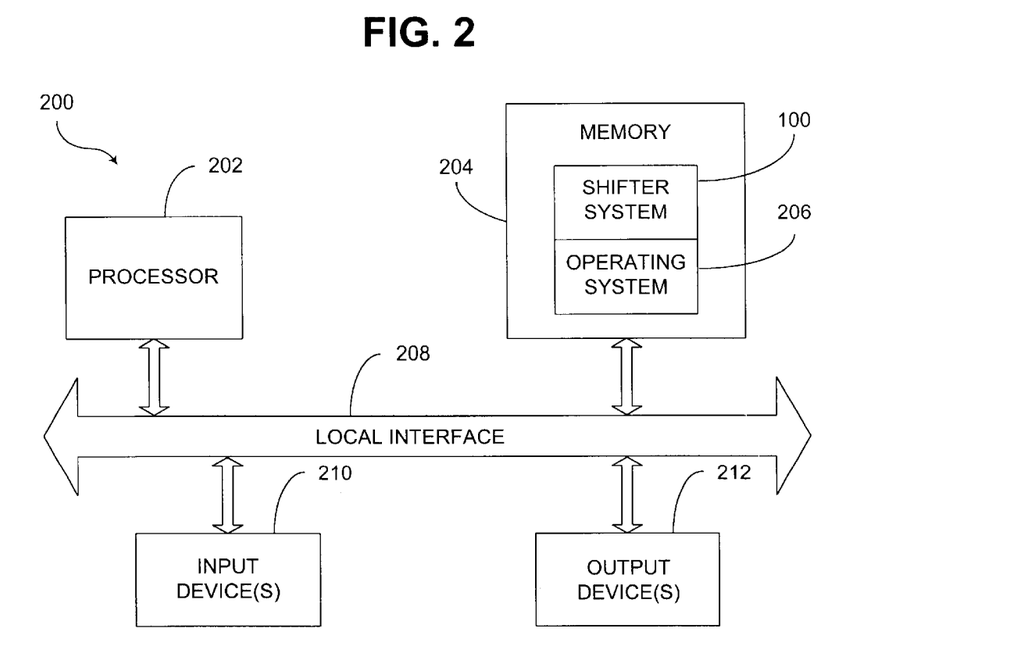
FIG. 2 is a schematic diagram depicting a processor-based system which may be utilized in implementing a preferred embodiment of the preferred invention.

FIG. 2 illustrates a typical computer or processor-based system 200 which may utilize the shifter system 100 of the present invention. As shown in FIG. 2, a computer system 200 generally comprises a processor 202 and a memory 204 with an operating system 206. Herein, the memory 204 may be any combination of volatile and nonvolatile memory elements, such as random access memory or read only memory. The processor 202 accepts instructions and data from memory 204 over a local interface 208, such as a bus(es). The system also includes an input device(s) 210 and an output device(s) 212. Examples of input devices may include, but are not limited to a serial port, a scanner, or a local access network connection. Examples of output devices may include, but are not limited to, a video display, a Universal Serial Bus, or a printer port. Generally, this system may run any of a number of different platforms and operating systems, including, but not limited to, Windows NT™, Unix™, or Sun Solaris™ operating systems. The shifter system 100 of the present invention, the functions of which shall be described hereinafter, resides in memory 204 and is executed by the processor 202.

Figure 3:
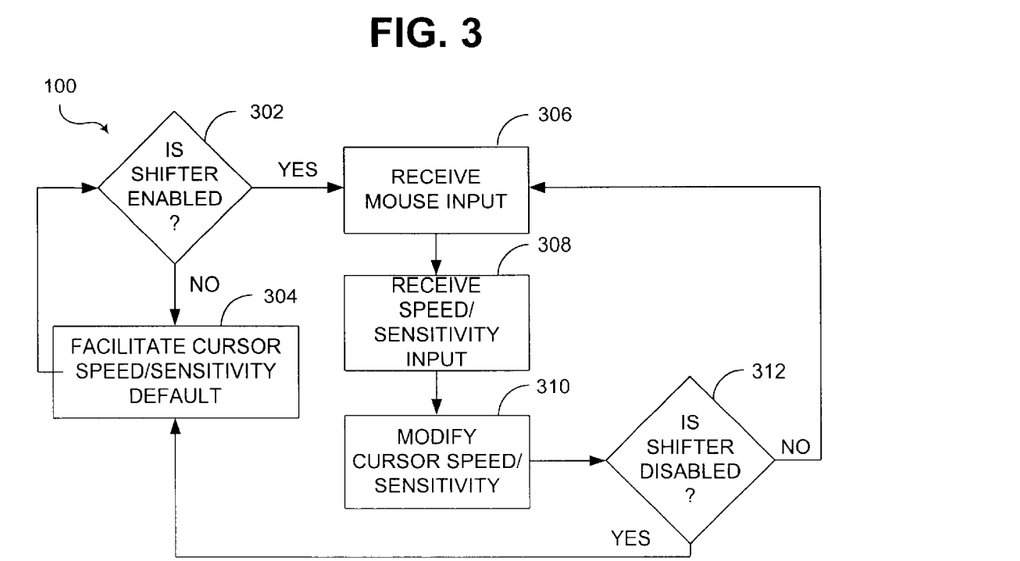
FIG. 3 is a high-level block diagram depicting a preferred method of the present invention.

The flowchart of FIG. 3 shows the functionality and operation of a preferred implementation of the shifter system 100 depicted in FIG. 2. In this regard, each block of the flow chart represents a module segment or portion of code which comprises one or more executable instructions for implementing the specified logical function or functions. It should also be noted that in some alternative implementations, the functions noted in the various blocks may occur out of the order depicted in FIG. 3. For example, two blocks shown in succession in FIG. 3 may in fact be executed substantially concurrently where the blocks may sometimes be executed in the reverse order depending upon the functionality involved.

As depicted in FIG. 3, the process preferably begins at block 302 where a determination is made as to where the shifter is enabled. If it is determined that the shifter is not enabled, the process preferably proceeds to block 304 where cursor speed/sensitivity defaults are facilitated. If, however, it is determined that shifter has been enabled, the process preferably proceeds to block 306 where mouse input, such as movement information and function information, for example, is received. At block 308 speed/sensitivity-modification input is received and then, such is depicted at block 310, cursor speed/sensitivity is modified in a manner corresponding to the modification inputs received. After appropriate modification, the process preferably proceeds to block 312, where a determination is made as to whether the shifter has been disabled. If it is determined that the shifter has not been disabled, the process preferably proceeds back to block 306 and then continues as described hereinbefore. If, however, it is determined that the shifter has been disabled, the process preferably returns to block 304 where a default cursor speed and sensitivity settings are once again facilitated. Thereafter, the process may return to block 302 and then proceed as described hereinbefore. Thus, alternating between the aforementioned enabled and disabled modes of the shifter allows an operator to conveniently alter the speed/sensitivity settings of the cursor between pre-established default settings and operator-modified settings.

Figure 4A:
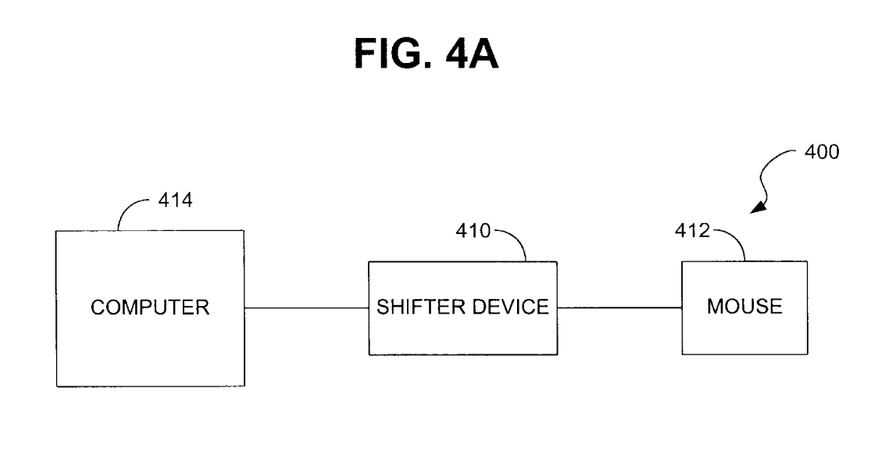
FIG. 4A is a schematic diagram depicting an embodiment of the present invention.

As depicted in FIG. 4A, a preferred embodiment 400 of the present invention incorporates the use of a shifter device 410. Shifter device 410 is electrically interconnected intermediate of a mouse-type input device 412 and its associated computer system 414, and preferably incorporates the use of one or more components or actuators (not shown) for "shifting" the device between the default and operator-modified cursor settings. Regardless of the particular configured utilized, the shifter device facilitates modification of cursor speed/sensitivity settings, thereby allowing a mouse-type input device to provide a more operator-friendly interface device.

Figure 4B:
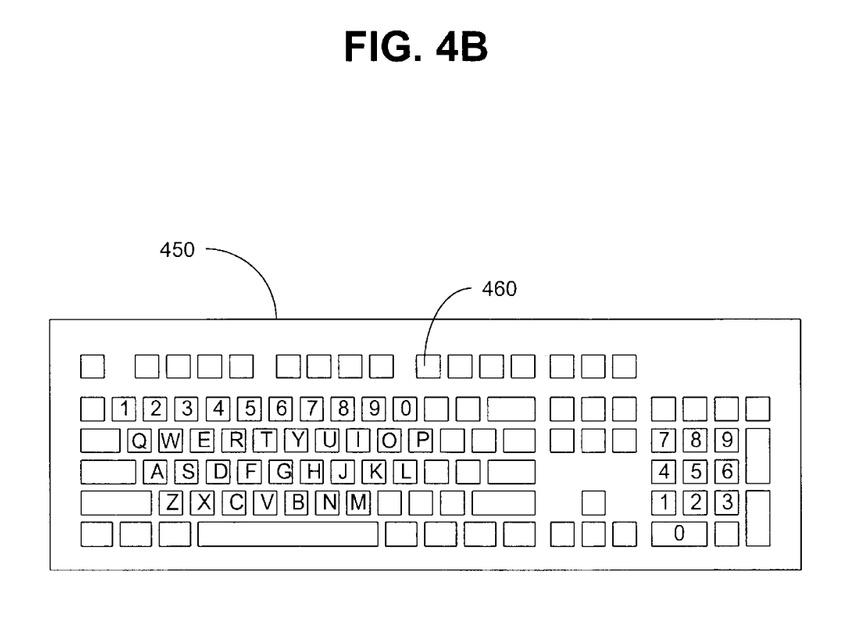
FIG. 4B is a schematic diagram depicting an embodiment of the present invention.

As depicted in FIG. 4B, an alternative embodiment 450 can use a keyboard to implement shifter functionality. In particular, keyboard 460 may utilize a user-specified key, e.g., key 470, which has been remapped as a shifter enable key. Thus, after the keyboard has been remapped, actuation of the shifter enable key enables cursor speed/sensitivity settings to be shifted between default and operator-modified cursor settings.

Figure 5:
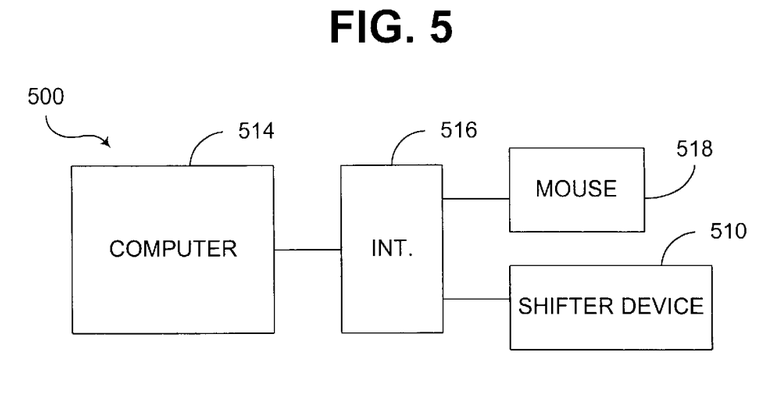
FIG. 5 is a schematic diagram depicting an embodiment of the present invention.

Referring now to FIG. 5, an alternative embodiment 500 also incorporates the use of a shifter device 510. In contrast to the embodiment depicted in FIG. 4, however, system 500 incorporates the use of such a shifter device in a non-in-line arrangement. In particular, the shifter device 510 is configured to provide shifter data to the computer 514 via an interface device or switch box 516 which also is configured to receive input from the mouse-type input device 518. So configured, the switch box facilitates interception and/or modification of movement information provided by the mouse-type input device, such as when a shifter-enable switch of the shifter device is actuated, for instance. Functional information provided by the mouse-type input device, however, is routed through the switch box and to the computer to facilitate various functionality provided by the mouse-type input device.

Figure 6:
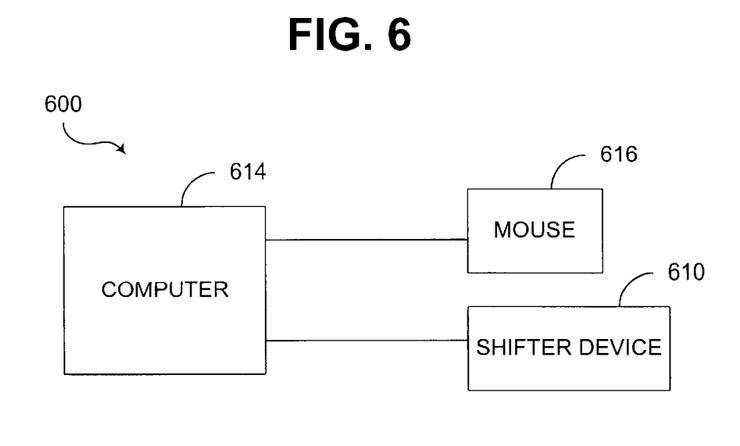
FIG. 6 is a schematic diagram depicting an embodiment of the present invention.

Referring now to FIG. 6, an alternative embodiment 600 incorporates the use of a shifter device 610 which is configured to provide shifter data directly to a computer 614. Preferably, the computer also is adapted to receive input from the mouse-type input device 616. So configured, the movement information provided by the mouse-type input device may be modified by the computer in response to data received from the shifter, thereby allowing the shifter device to influence cursor location and movement, while functional information provided by the mouse-type input device continues to provide various mouse functionality. Such a configuration may be implemented by use of a software application, such as the application described in relation to FIG. 3, for instance.

Figure 7:
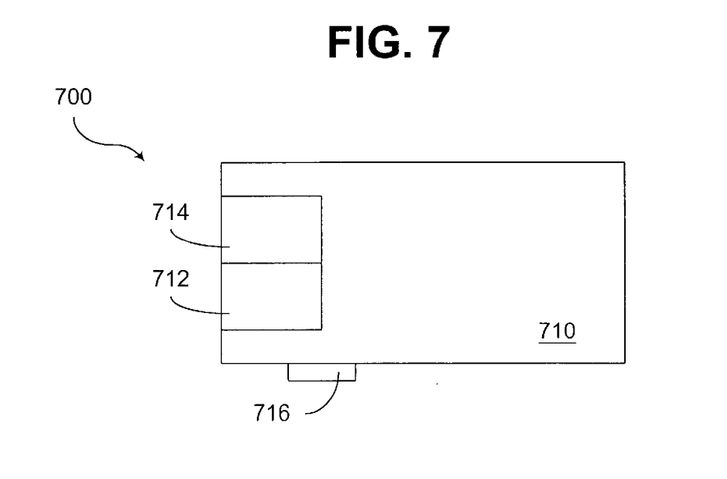
FIG. 7 is a schematic diagram depicting an embodiment of the present invention.

A preferred embodiment of a shifter device 700 of the present invention is depicted in FIG. 7. As shown therein, shifter device includes a body 710, primary actuators 712 and 714, and a secondary actuator 716. Preferably, actuators 712 and 714 are configured for providing conventional mouse functionality, such as "left-click" and "right-click" functions, respectively, and secondary actuator 716 provides shifter functionality, as described in detail hereinbefore. The actuators may be provided in numerous configurations and arrangements in order to fulfill their respective intended functions. It also should be noted that shifter device 700 is capable of providing cursor movement data to a computer in one of various conventional manners.

Figure 8:
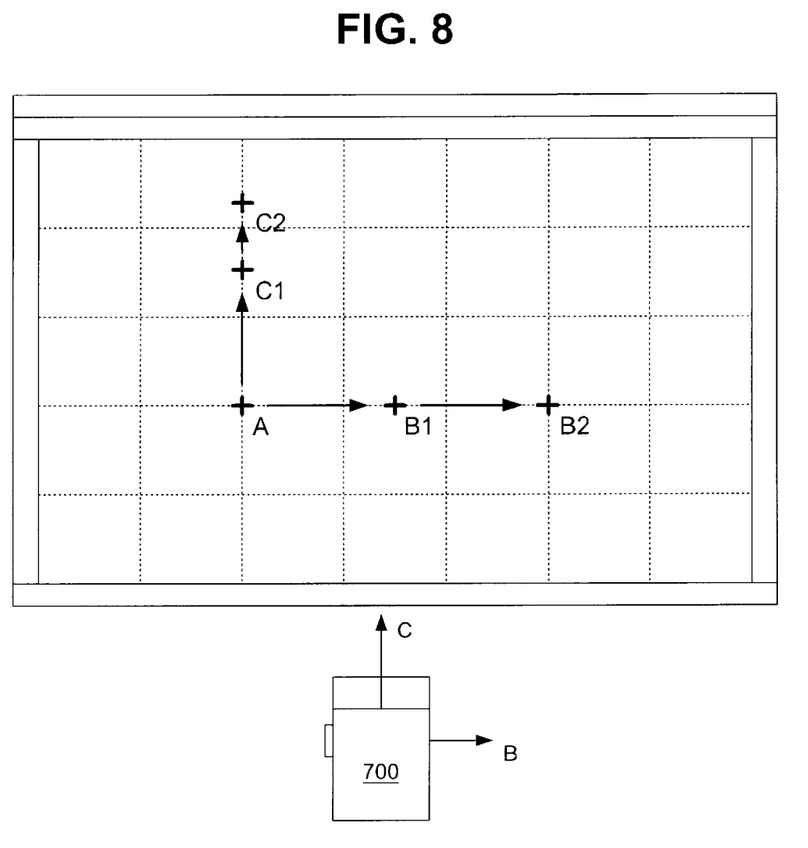
FIG. 8 is a diagram depicting representative cursor movement facilitated by a preferred embodiment of the present invention.

Referring now to FIG. 8, the movement of a cursor, such as from location A to B1 (or C1) typically is facilitated by a corresponding movement, i.e., a movement characterized by a direction and a distance, of a mouse-type input device, e.g., device 700 being moved from A to B (or A to C). The shifter of the present invention may interface with a computer so that the same movement of the mouse-type input device allows the cursor to be moved to a different location on the display device. For instance, as depicted in FIG. 8, the shifter may allow the cursor to be moved from position A to B2 (or C2), with the same movement of the mouse-type input device described hereinbefore in relation to B1 and C1, respectively.

When utilizing a shifter device, such as the shifter device 700 (FIG. 7), to facilitate the aforementioned cursor movements, the speed/sensitivity setting may be conveniently changed by actuating shifter-enable switch 716 by a simple movement of the thumb.

The present invention accommodates numerous setting/sensitivity schemes, such as a single-click scheme, whereby a single, modified setting may be actuated by actuating a shift-enable switch, and a multi-click scheme, whereby multiple settings may be actuated by actuating a shift-enable switch an appropriate number of times, among others.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. An input device for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said input device comprising:

a shifter configured to electrically communicate with the computer, said shifter being configured to enable functional information, provided by the mouse-type input device, to provide selected functionality of the cursor, said shifter having a shift-disable mode and a shift-enable mode, in said shift-disable mode said shifter being configured to enable the mouse-type input device to influence movement of the cursor on the display device such that a movement of the mouse-type input device in a first direction and a first distance results in the cursor moving in the first direction and a corresponding second distance, said second distance corresponding to default cursor speed/sensitivity settings, and in said shift-enable mode said shifter being configured to enable altering of movement of the cursor such that movement of the mouse-type input device in the first direction and the first distance results in the cursor moving in the first direction and a corresponding third distance, the third distance being unequal to the second distance, said third distance corresponding to operator-modified cursor speed/sensitivity settings.

2. The input device of claim 1, wherein said shifter has a shift-enable switch associated therewith, said shift-enable switch being adapted to selectively configure said shifter between said shift-disable mode and said shift-enable mode.

3. The input device of claim 1, wherein the computer system has a keyboard associated therewith, and wherein said shift-enable switch corresponds to one of the keys of the keyboard.

4. A computer system for operating a computer application, said computer system comprising:

a display device having a display area configured to display graphical information thereon;

a mouse-type input device configured to provide a user-interface with the computer application, the computer application being adapted to display a cursor within said display area of said display device, said mouse-type input device being configured to provide movement information and functional information corresponding to the cursor such that the cursor is movable about said display area in response to said movement information and being configured to provide selected functionality to the cursor in response to said functional information; and a shifter configured to electrically communicate with the computer, said shifter being configured to enable functional information, provided by the mouse-type input device, to provide selected functionality of the cursor, said shifter having a shift-disable mode and a shift-enable mode, in said shift-disable mode said shifter being configured to enable the mouse-type input device to influence movement of the cursor on the display device such that a movement of the mouse-type input device in a first direction and a first distance results in the cursor moving in in the first direction and a corresponding second distance, said second distance corresponding to default cursor speed/sensitivity settings, and in said shift-enable mode said shifter being configured to enable altering of movement of the cursor such that movement of the mouse-type input device in the first direction and the first distance results in the cursor moving in the first direction and a corresponding third distance, the third distance being unequal to the second distance, said third distance corresponding to operator-modified cursor speed/sensitivity settings.

5. The computer system of claim 4, wherein said shifter has a shift-enable switch associated therewith, said shift-enable switch being adapted to selectively configure said shifter between said shift-disable mode and said shift-enable mode.

6. The computer system of claim 4, further comprising a keyboard associated therewith, and wherein said shift-enable switch corresponds to one of the keys of said keyboard.

7. A method for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said method comprising:

enabling movement information provided by the mouse-type input device to influence movement of the cursor on the display device such that a movement of the mouse-type input device in a first direction and a first distance results in the cursor moving in the first direction and a corresponding second distance, said second distance corresponding to default cursor speed/sensitivity settings;

enabling functional information, provided by the mouse-type input device, to provide selected functionality of the cursor; and enabling an altering of movement of the cursor such that movement of the mouse-type input device in the first direction and the first distance results in the cursor moving in the first direction and a corresponding third distance, the third distance being unequal to the second distance, said third distance corresponding to operator-modified cursor speed/sensitivity settings.

8. The method of claim 7, wherein the step of enabling an altering of movement of the cursor comprises the steps of:

providing a shifter device electrically communicating with the computer;

determining whether a shifter-enable function of the computer is enabled; and if the shifter-enable function is enabled, modifying the movement information provided by the mouse-type input device.

9. The method of claim 8, wherein the step of modifying the movement information comprises the step of:

intercepting the movement information provided by the mouse-type input device.

10. The method of claim 7, wherein the computer has a keyboard input device, and wherein the step of enabling an altering of movement of the cursor comprises the step of:

re-mapping a first key of the keyboard such that actuation of the first key corresponds to a shifter-enable function being enabled;

determining whether a shifter-enable function of the computer is enabled; and if the shifter-enable function is enabled, modifying the movement information provided by the mouse-type input device.

11. The method of claim 7, wherein the operator-modified cursor speed/sensitivity settings are selected by the operator interfacing with the computer application.

12. A computer readable medium having a computer program for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said computer readable medium comprising:

logic configured to enable movement information provided by the mouse-type input device to influence movement of the cursor on the display device such that a movement of the mouse-type input device in a first direction and a first distance results in the cursor moving in the first direction and a corresponding second distance, said second distance corresponding to default cursor speed/sensitivity settings;

logic configured to enable functional information, provided by the mouse-type input device, to provide selected functionality of the cursor; and logic configured to enable an altering of movement of the cursor such that movement of the mouse-type input device in the first direction and the first distance results in the cursor moving in the first direction and a corresponding third distance, the third distance being unequal to the second distance, said third distance corresponding to operator-modified cursor speed/sensitivity settings.

13. The computer readable medium of claim 12, wherein the computer ha keyboard input device, and wherein said logic configured to logic configured to enable an altering of movement of the cursor comprises:

logic configured to re-map a first key of the keyboard such that actuation of the first key corresponds to a shifter-enable function being enabled;

logic configured to determine whether a shifter-enable function of the computer is enabled; and logic configured to modify the movement information provided by the mouse-type input device if the shifter-enable function is enabled.

14. The computer readable medium of claim 12, wherein the computer has a keyboard input device, and wherein said logic configured to logic configured to enable an altering of movement of the cursor comprises:

logic configured to determining whether a shifter-enable function of the computer is enabled; and logic configured to modify the movement information provided by the mouse-type input device if the shifter-enable function is enabled.

15. The computer-readable medium of claim 12, wherein the logic configured to enable an altering of movement of the cursor comprises logic configured to enable an operator to select the operator-modified cursor speed/sensitivity settings by interfacing with the computer application.

16. An input device for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said input device comprising:

means for enabling functional information, provided by the mouse-type input device, to provide selected functionality of the cursor;

means for enabling the mouse-type input device to influence movement of the cursor on the display device such that a movement of the mouse-type input device in a first direction and a first distance results in the cursor moving in the first direction and a corresponding second distance, said second distance corresponding to default cursor speed/sensitivity settings; and     means for enabling an altering of movement of the cursor such that movement of the mouse-type input device in the first direction and the first distance results in the cursor moving in the first direction and a corresponding third distance, the third distance being unequal to the second distance, said third distance corresponding to operator-modified cursor speed/sensitivity settings.

\* \* \* \* \*